United States Patent [19]

Smith

[11] 3,761,744

[45] Sept. 25, 1973

[54] SEMICONDUCTOR CHARGE TRANSFER DEVICES

[75] Inventor: George Elwood Smith, Murray Hill, N.J.

[73] Assignee: Bell Telephone Laboratories, Incorporated, Murray Hill, N.J.

[22] Filed: Dec. 2, 1971

[21] Appl. No.: 204,239

[52] U.S. Cl. .......... 307/304, 317/235 G, 317/235 R
[51] Int. Cl. .......... H01l 11/14
[58] Field of Search .......... 317/235 G, 235 T; 307/304

[56] References Cited

UNITED STATES PATENTS 3,665,214 5/1972 Krambeck .......... 317/235

*Primary Examiner*—Jerry D. Craig
*Attorney*—W. L. Keefauver

[57] ABSTRACT

Shift register devices of the type that transfer charge along a semiconductor wafer through the appropriate formation of successive potential wells in the wafer are described. Transferred charge is regenerated by designing the parameters of the device such that, if charge is to be transferred from one storage region to the next, the potential well for causing the transfer is of sufficient value to cause avalanche breakdown; whereas if no charge is to be transferred, the potential well is insufficient to cause avalanche breakdown. Selective breakdown in this manner regenerates the charge being transferred through the production of additional current carriers.

10 Claims, 7 Drawing Figures

SEMICONDUCTOR CHARGE TRANSFER DEVICES

BACKGROUND OF THE INVENTION

This relates to information storage devices, and, more particularly, to semiconductor charge transfer devices.

A recent development of far-reaching importance is the charge-coupled device (CCD), first described in a paper by W. S. Boyle and G. E. Smith entitled "Charge Coupled Semiconductor Devices," *The Bell System Technical Journal*, Vol. 49, page 587 (1970). The CCD is basically a shift register device comprising a succession of electrodes separated from a bulk semiconductor wafer by a thin oxide dielectric. Charge can be temporarily stored in the semiconductor opposite one of the electrodes by maintaining an appropriate electrode voltage. A higher reverse-bias voltage on an adjacent electrode will then form a potential well in the semiconductor and cause the charge to be transferred to the region opposite the adjacent electrode. As will be explained more fully later, packets of charge representing information quanta can in this manner be transferred rapidly along a succession of electrodes with the direction of transfer being determined by the phase of voltages applied to successive electrodes or by an asymmetrical feature built into the electrodes.

The significance of the charge-coupled device lies in its structural simplicity, efficiency, low power consumption, and its adaptability as an information processing unit. Shift registers are, of course, fundamental components of computers and other data processing systems. Additionally, however, the charge-coupled device is potentially useful for converting imaged light to electrical signals; in this case, the charge packets referred to above may be generated by light radiation incident on the semiconductor.

A related form of charge transfer device is the "bucket brigade" device, described, for example, in the article "The New Concept for Memory and Imaging: Charge Coupling," *Electronics*, June 21, 1971, at page 58. Another form of bucket brigade device is described in a paper by F. L. J. Sankster and K. Tier, I.E.E.E. *Journal of Solid State Circuits*, Volume SC-1, page 131 (1969).

The field of charge transfer devices is surveyed in the foregoing Electronics article and in the paper "Charge-Coupled Devices—A New Approach to MIS Device Structures," I.E.E.E. *Spectrum*, page 18 July 1971, both of which describe the importance of simplifying silicon shift register devices and obtaining high storage cell packing densities with low power requirements. They also point out that some charge is lost with each charge packet transfer, thereby necessitating periodic regeneration of the stored charge. Such regeneration or amplification circuits, of course, require numerous silicon diffusions and detract from the inherent simplicity of charge transfer devices.

SUMMARY OF THE INVENTION

Accordingly, it is an object of this invention to simplify the structure and operation of charge transfer devices.

More particularly, it is an object of this invention to provide regeneration of charge in charge transfer devices in a manner that minimizes structural and operational complexities.

These and other objects of the invention are attained in an illustrative embodiment comprising a charge coupled device shift register of the general type described above. It is self-evident that the potential well required for transfering stored charge from one storage region to the next necessarily results in a localized voltage within the semiconductor. As will be explained more fully later, this voltage is inherently smaller if a packet of charge is being actually transferred between storage regions than if no charge is being transferred. Stated another way, the externally applied voltages for transferring charge produce a first internal semiconductor voltage $\Delta V_0$ if no charge is transferred between successive storage cells, and a different, higher, internal voltage $\Delta V_1$ if an actual transfer of charge does take place.

In accordance with this embodiment of the invention, the parameters of the device are arranged such that $\Delta V_1$ is higher than the threshold voltage for avalanche breakdown of the semiconductor, while $\Delta V_0$ is insufficiently high to cause such breakdown. Thus, localized avalanche breakdown occurs whenever charge is transferred between successive storage cells, but does not occur if such charge is not transferred. Avalanche breakdown, of course, results in copious production of current carriers, including minority carriers of the type defining a packet of charge. The newly produced minority carriers are attracted to the successive storage region and regenerate the packet of charge representing a quantum of information.

In accordance with another feature of the invention, the performance and accuracy of the device may be improved by reducing the electric field at the surface of the semiconductor substantially to zero between transfer operations. As will be explained later, this causes a small predictable number of majority carriers to be trapped at the surface, which are then available for subsequent recombination with an equal number of minority carriers. The resulting predictable loss of minority carriers prevents a cumulative build-up of charge, with successive transfers, in positions in which a zero charge is intended; but, because of the repeated regeneration of desired charge, it has a negligible effect on charge which is intended to be transferred.

While the invention is most easily explained with reference to charge-coupled devices, it is also applicable to "bucket brigade" devices. Various techniques for designing parameters so as to comply with the above requirements will be described later. It will be appreciated that the invention provides charge regeneration without any additional structure or operational steps, but only through compliance with certain parameter requirements.

These and other objects, features, and advantages of the invention will be better understood from a consideration of the following detailed description taken in conjunction with the accompanying drawing.

DRAWING DESCRIPTION

FIGS. 1A, 1B, and 1C are schematic illustrations of a charge-coupled device, illustrating charge transfer in accordance with an illustrative embodiment of the invention;

DRAWING DESCRIPTION

Figure 1A:
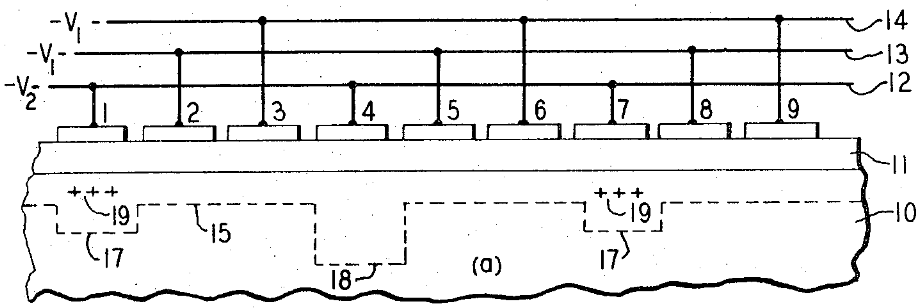
Figure 1B:
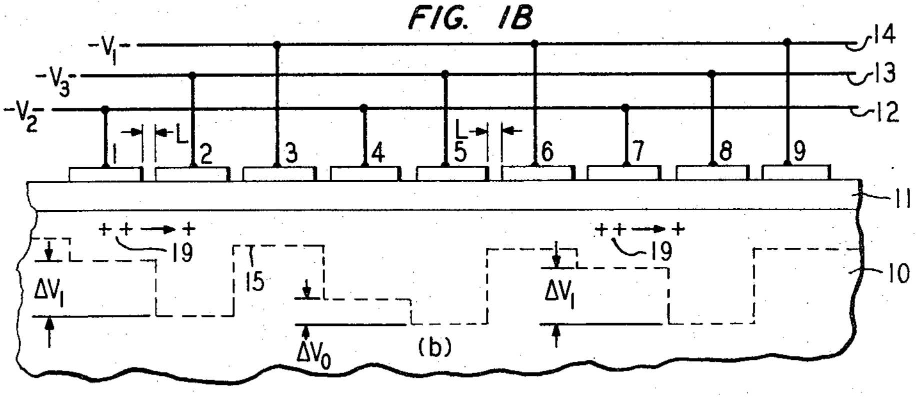
Figure 1C:
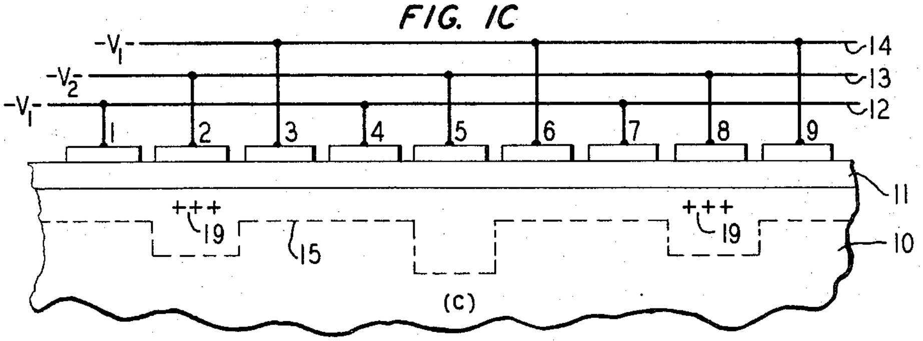

Referring now to FIGS. 1A–1C, there is shown a charge-coupled device, of a type well-known in the art, comprising a semiconductor wafer 10 overlaid by a dielectric layer 11 and a succession of electrodes numbered 1 through 9. The wafer 10 may typically be n-type silicon with the dielectric layer 11 being a thin film of silicon dioxide. The purpose of the apparatus is to store temporarily information quanta, each represented by the presence or absence of a packet of charge, and to transfer the information quanta from an input end at the left to an output end at the right. This is accomplished by adjusting the voltages on three transmission lines 12, 13, and 14 connected, respectively, to every third electrode. As such, this particular form of charge-coupled device is known as a three-phase device.

Consider the wafer to be n-type and the information quanta to be represented by minority carriers or "holes," designated on the drawing by plus signs. Referring to FIG. 1A, lines 13 and 14 are at a negative voltage $V_1$, while line 12 is at a higher negative voltage $V_2$. These negative voltages produce a potential profile 15 along the surface of wafer 10; profile 15 could also be considered a diagram of the edge of a continuous depletion layer in wafer 10, the depth of which is proportional to the square root of the surface potential. Charge packets of positive holes may be stored in regions having a "potential well;" that is, in regions having a higher negative potential, which in this case corresponds to electrodes 1, 4, and 7. Assume that charge packets 19 have been trapped beneath electrodes 1 and 7, as indicated by the plus charges, but none have been trapped beneath electrode 4. Packets 17 could represent a digital "one," while the absence of a packet beneath electrode 4 could represent a digital "zero."

Referring to FIG. 1B, information is shifted to the right by the application of a negative voltage $V_3$ to line 13, which forms a potential well between each third electrode 2, 5, and 8. The large negative voltage attracts the plus charges as indicated by the arrows, thereby causing each charge packet 19 to be shifted to the right. After the shifting operation, the voltage on line 12 is raised to value $V_1$, and that on line 13 to $V_2$. This represents the storage state of FIG. 1C in which the charge packets 19 are stored in regions defined by electrodes 2 and 8. The absence of a charge packet, which formerly existed at electrode 4, is shifted to electrode 5.

Eventually, of course, all signals are shifted to an output device at the right end of the series of electrodes, which for clarity has not been shown. The input device may be a p-n junction which injects minority carriers to the first electrode of the array, it may be an electrode that causes avalanche breakdown, or, if the device is being operated as an imaging device, the charge packets may be generated by incoming light energy incident on the semiconductor. These and other features of charge-coupled device shift registers are well-known in the art and thoroughly described in the literature cited previously.

It is generally understood that the efficiency of transfer of charge packets is imperfect and that the stored charge must therefore normally be periodically regenerated. The present invention is directed to a regeneration technique which makes use of the observation that the potential in a storage cell in which a charge packet is stored is smaller than that in which no charge packet is stored. This phenomenon is depicted in FIG. 1A in which electrodes 1, 4, and 7 are all externally biased at voltage $-V_2$, but the potential profile shows a smaller surface potential 17 beneath electrodes 1 and 7 than the potential 18 beneath electrode 4, in which no charge is stored.

The reason for this difference is that, with a stored positive charge packet 19, a larger portion of voltage $V_2$ extends across dielectric layer 11 than where no such charge is stored. Thus, the potential at the surface of semiconductor 10 adjacent electrode 4 is of a higher negative value than that adjacent electrodes 1 and 7 because a relatively greater proportion of the voltage $-V_2$ extends across the semiconductor. Another consequence is that the edge of the depletion layer is physically deeper within the semiconductor beneath electrode 4 than beneath electrodes 1 and 7.

Referring to FIG. 1B, during the transfer stage, the potential wells caused by voltage $-V_3$ produce an internal voltage diference $\Delta V_1$ between electrodes 1 and 2 and electrodes 7 and 8 and a voltage difference $\Delta V_0$ in the semiconductor between the electrodes 4 and 5. It can be appreciated that the voltage difference $\Delta V_1$, in which a charge packet 19 is actually transferred, is inherently larger than the voltage difference $\Delta V_0$ where no charge is being transferred.

In accordance with the invention, the various device parameters are arranged such that the voltage $\Delta V_1$ is sufficient to cause avalanche breakdown, but the voltage $\Delta V_0$ is insufficient to cause avalanche breakdown. In other words, $$\Delta V_1 > V_B > \Delta V_0 \qquad (1)$$

where $V_B$ is the avalanche breakdown voltage between adjacent cells.

The concept of a critical avalanche breakdown voltage within a semiconductor crystal is well-understood in the art. When the internal voltage exceeds this value, an electron colliding with a silicon atom produces a hole-electron pair, with the secondary electron producing another hole-electron pair. As this process repeats itself, numerous electrons and holes are produced which are attracted in opposite directions by the electric field. The holes are trapped by the adjacent potential wells shown in FIG. 1B and thereby regenerate the charge packets 19.

Each time a charge is transferred from one storage region to the next, this avalanche breakdown occurs, thereby regenerating the quantity of charge stored. Hence, there is no need for the transistor regenerating devices normally required in charge transfer device shift registers of the type thus far described.

It is apparent that, for applied voltage $-V_3$ to produce the internal voltage $\Delta V_1$ needed for breakdown, it must be applied at a sufficiently high speed; if it were applied too slowly, the charge packet would be transferred before the avalanche voltage was reached. Thus, the rise time of the $-V_3$ voltage pulse must be smaller than the transfer time of the charge packets. Since CCD's are normally designed to be high-speed devices, this constraint would normally be inherently met.

While it is customary to refer to breakdown voltages, it is perhaps more accurate to speak in terms of the critical electric field intensity $E_B$ required for avalanche breakdown within the crystal. In terms of this parameter, the required voltage $V_1$ may be expressed as $$\Delta V_1/L \geq E_B \quad (2)$$

where L is the distance between electrodes giving rise to the voltage $\Delta V_1$. This expression makes it clear that the successive electrodes of the device must be sufficiently close to produce the required high electric field intensity $E_B$ needed for avalanche breakdown. Moreover, with the electrode configuration shown, the electric fields within the wafer are fringing fields rather than direct fields, and Equation (2) is more accurately written as:

$$\Delta V_1/\alpha L \geq E_B \quad (3)$$

where, with the configuration shown in FIG. 1, $\alpha$ is a parameter equal to approximately three. $E_B$ for crystalline silicon is about $2 \times 10^5$ volts per centimeter. Thus, if $\Delta V_1$ were 15 volts, the spacing L depicted in FIG. 1B would have to be about 0.25 microns.

Figure 2:
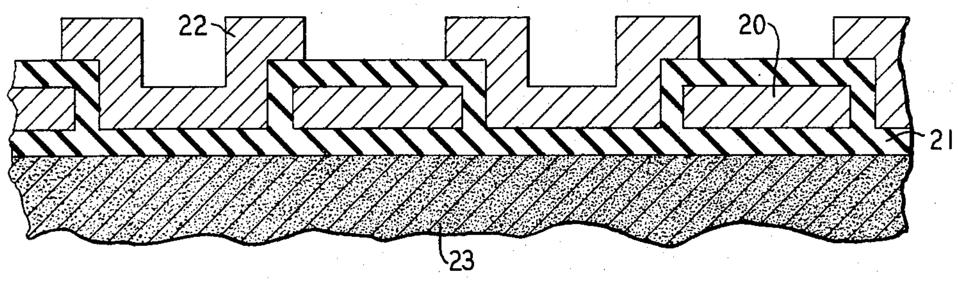
FIG. 2 is an illustration of another charge-coupled device in accordance with another embodiment of the invention.

While the FIG. 1 embodiment can be made with appropriately small spacings L, it is known that the spacings can be reduced through the use of the structure shown in FIG. 2, which is disclosed in the aforementioned *Electronics* and I.E.E.E. *Spectrum* articles. Alternate electrodes 20 of the FIG. 2 structure are "buried" within the oxide dielectric 21. The remaining electrodes 22 are formed so as to overlap adjacent electrodes 20 while remaining insulated as before. The buried electrodes 20 may be formed of polysilicon, while electrodes 22 may be aluminum. Charge is, of course, stored in the silicon wafer 23, as before.

Figure 3A:
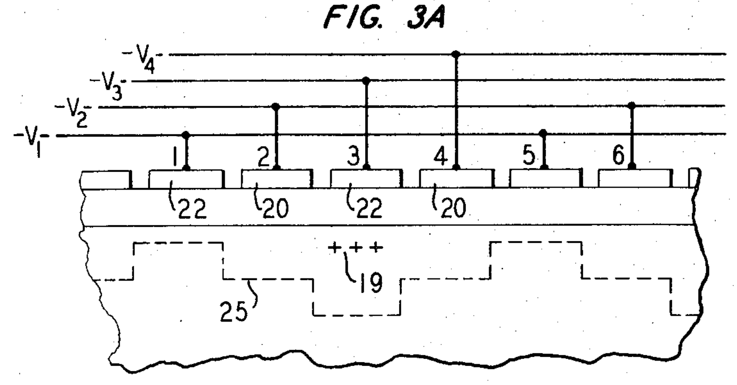
FIGS. 3A and 3B illustrate information transfer in the embodiment of FIG. 2.
Figure 3B:
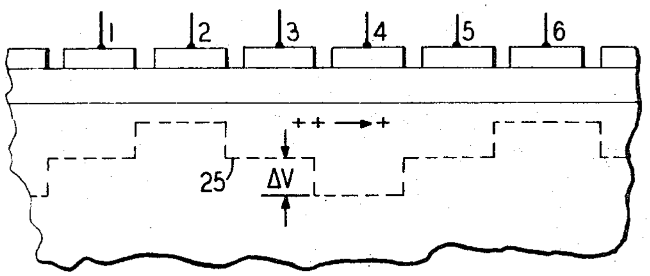

As is known, the structural configuration of FIG. 2 is normally used in four-phase charge-coupled devices, in which charge is transferred through the application of voltages as shown in FIGS. 3A and 3B. As shown, applied voltages $-V_1$, $-V_2$, $-V_3$, and $-V_4$ form a characteristic voltage profile 25 within the wafer in which the charge packet 19 is stored in the voltage well formed by electrode 3 at applied voltage $-V_3$. Referring to FIG. 3B, the charge is shifted to the right by, in effect, shifting the entire voltage profile to the right. The stored charge must necessarily be attracted to the potential well formed by electrode 4, as shown. As is known, the circuit of FIGS. 2 and 3 can be designed as a series of shift registers connected in a serpentine fashion to yield a high packing density.

In accordance with the invention, the voltage $\Delta V$ is larger than the breakdown voltage if charge is being transferred, but is below the breakdown voltage if no charge is transferred. Thus, the charge packet 19 is regenerated during each transfer, as before.

One drawback of both prior art CCD's and the devices of FIGS. 1–3 is that each charge transfer is invariably incomplete; a few minority carriers of the charge packet intended to be transferred are not transferred. Because of this incomplete transfer, minority carriers tend to accumulate in zero digit locations where none is intended. As these unwanted carriers are transferred during subsequent shift register operations, additional carriers are accumulated and the number at any given zero location may increase sufficiently to produce a spurious "one" at the output. The likelihood of such spurious outputs increases with the number of storage locations in the shift register.

I have found that in the devices of FIGS. 1 and 3, these problems can be overcome by the simple expedient of making the voltage $-V_1$ sufficiently small; more explicitly, the voltage $-V_1$ is sufficiently small that the electric field at the semiconductor-oxide interface is substantially zero or if a positive value beneath the electrode biased at $-V_1$. Thus, majority carriers (electrons) will diffuse or be attracted to the surface and a predictable number will be trapped at the surface by surface traps. As is known, a surface trap, sometimes known as a "surface state," is an energy state at a crystal surface capable of immobilizing an electron much as an ion does by chemical bonding. The number and energy levels of such surface traps are readily predictable and so the number of electrons that will be contained at the surface is likewise predictable.

When the electrode voltage changes to create a potential well with an accompanying depletion region, the trapped electrons are not swept out, but rather recombine with holes attracted by the potential well. If the incoming holes are part of a charge packet representing a digital "1," this recombination will constitute a loss; but it will be a loss that is negligibly small by comparison to the gain resulting from avalanche breakdown regeneration. On the other hand, the number of trapped electrons will nearly always be sufficient to virtually eliminate the unwanted holes that may be carried over in a "zero" digit position.

One can control to some extent the number of electrons trapped by controlling the voltage $V_1$. For most purposes, adequate compensation will be obtained by using as $V_1$ a voltage substantially equal to the "flat-band" voltage; i.e., a voltage sufficient to prevent bending of the conduction and valence bands at the semiconductor-oxide interface. A somewhat greater number of electrons will be attracted to the semiconductor-oxide interface if the voltage $V_1$ is made to be more positive than the flat-band voltage. It is also to be understood that surface states are merely one example of recombination centers that may trap a majority carrier for subsequent recombination. As is known, recombination centers can be artificially introduced by impurity diffusion or implantation, particle bombardment, etc.

Of course, with the foregoing feature, the likelihood of spurious outputs is substantially reduced, output accuracy is increased, and therefore the number of successive storage cells that may be used in the shift register can be substantially increased. This feature is made possible only because the desired charge packets are regenerated at each transfer, which makes tolerable the predictable losses resulting from hole-electron recombination.

Figure 4:
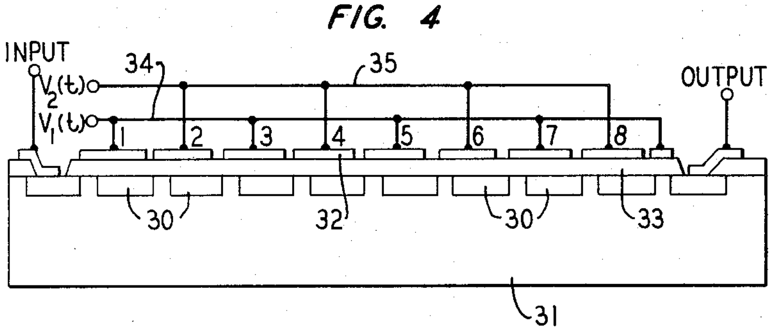
FIG. 4 is a schematic illustration of a "bucket brigade" device in accordance with another embodiment of the invention.

Referring now to FIG. 4, there is shown a "bucket brigade" shift register device in which the present invention may be used for information regeneration. As is known, the bucket brigade device may typically comprise a plurality of p-type regions 30 diffused into an n-type silicon wafer 31. An array of electrodes 32 are insulated from the layer by a dielectric layer 33. Odd-numbered electrodes are connected to a line 34 driven by a signal having a first phase $V_1(t)$, while even-numbered electrodes are connected to a line 35 driven by a signal having a phase $V_2(t)$.

In the unloaded state, all of the p-islands 30 are strongly reverse-biased with respect to the substrate; they therefore have a deficiency of holes. A signal is introduced by transferring a packet of positive charges or holes to the first p-island, which reduces its negative potential. Information is transferred by driving $V_2$ to a negative value while driving $V_1$ to a more positive potential. The p-island coupled to line 35 ($V_2$) now becomes the drain of an IGFET, which has its channel coupled to the $V_2$ gate, and the p-island coupled to line 34 ($V_1$) is the source. If the source is carrying a signal charge, a channel will be induced between the two p-islands, and the charge will flow forward into the drain until the potential on a source p-island is sufficiently reduced. As clock signals $V_1$ and $V_2$ reverse their phases, the even-numbered electrodes become sources; and the odd-numbered electrodes drains, and the cycle is repeated. By this means, information is advanced two p-islands for each cycle of the clock.

In accordance with the invention, the device parameters are arranged as described before such that if charge is transferred between successive islands, an avalanche breakdown will regenerate the transferred charge, while no such breakdown will occur if charge is not transferred.

In summary, it can be appreciated that there are many forms of charge transfer devices in which the invention may be used for periodically regenerating charge as it is being transferred. While three-phase and four-phase charge-transfer devices and "bucket brigade" devices have been shown in the drawings, and devices using silicon integrated circuit technology have been described in the specification in detail, it is clear that the invention could be used in numerous other structures such as two-phase CCD's, and devices made of other materials with different conductivities.

Various other embodiments and modifications may be made by those skilled in the art without departing from the spirit and scope of the invention.

What is claimed is:

1. In semiconductor signal transfer apparatus of the type comprising a plurality of electrodes successively arranged along a surface of a semiconductor wafer, the electrodes corresponding to information storage regions in the wafer, and means for transferring charge representative of information along the wafer comprising means for producing successive voltages between successive electrodes, the improvement wherein:

the voltage applied to an electrode for causing charge to be transferred between successive storage regions is sufficiently large to cause a semiconductor avalanche breakdown if there is charge representative of an information bit stored in the next preceding storage region, but insufficient to cause avalanche breakdown if there is no such charge stored in the next preceding storage region, whereby any charge transferred between successive storage regions is regenerated by avalanche breakdown.

2. The signal transfer apparatus of claim 1 wherein: said plurality of electrodes are separated from the semiconductor wafer by a thin dielectric layer.

3. The signal transfer apparatus of claim 2 wherein:

the region of the semiconductor wafer adjacent said plurality of electrodes in which charge is stored and transferred is substantially free of any rectifying junctions; and said transferred charge comprises minority current carriers in said semiconductor wafer.

4. The signal transfer apparatus of claim 2 wherein:

each storage region in the wafer is defined by a region doped to a conductivity opposite that of the major portion of the wafer, whereby said signal transfer apparatus operates as a "bucket brigade" device.

5. The apparatus of claim 3 wherein:

the wafer is an n-type wafer and the transferred charge comprises holes.

6. Semiconductor signal translating apparatus comprising:

a semiconductor crystal having on one surface thereof an array of electrodes each defining successive storage regions;

means for forming in at least one of the storage regions of the semiconductor crystal a packet of charges;

means for applying a voltage V between successive electrodes of sufficient value to controllably transfer the packet of charges between successive storage regions;

said voltage V creating a localized voltage $\Delta V_0$ within the semiconductor crystal in the absence of a packet of charge, and a localized voltage $\Delta V_1$ in the crystal in the presence of a packet of charge, the voltage $\Delta V_1$ being greater than $\Delta V_0$;

said semiconductor crystal being characterized by an avalanche breakdown voltage $V_B$ between the storage regions where $V_B$ has a value between $\Delta V_0$ and $\Delta V_1$, whereby avalanche breakdown occurs if a packet of charge is being transferred, but no breakdown occurs in the absence of a packet of charge.

7. The signal translating apparatus of claim 6 wherein:

the semiconductor is predominantly of one conductivity, and the packet of charges constitutes minority carriers.

8. The signal translating apparatus of claim 7 wherein:

the voltage applying means comprises a succession of electrodes separated from the crystal by a thin dielectric layer.

9. The signal translating apparatus of claim 8 further comprising:

means for periodically applying to each of the electrodes a voltage sufficiently small to permit semiconductor majority carriers to be transported to a location near the interface of the crystal and a thin dielectric layer, thereby permitting majority carriers to be temporarily contained at or near the surface by recombination centers such as surface traps.

10. The signal transmitting apparatus of claim 9 wherein:

the aforesaid sufficiently small voltage is substantially equal to the flat-band voltage of the semiconductor.

* * * * *